United States Patent
Holliday

[11] Patent Number: 5,136,936
[45] Date of Patent: Aug. 11, 1992

[54] EMBOSSING REGISTRATION SYSTEM

[75] Inventor: Ken Holliday, Decatur, Ga.

[73] Assignee: Southeastern Die Company, Decatur, Ga.

[21] Appl. No.: 792,673

[22] Filed: Nov. 15, 1991

[51] Int. Cl.⁵ .............................................. B31F 1/07
[52] U.S. Cl. .................................... 101/28; 101/383; 101/394
[58] Field of Search ............... 101/28, 383, 394, 408; 100/918; 269/309, 284; 411/354, 348, 347, 549, 551

[56] References Cited

U.S. PATENT DOCUMENTS

| 229,291 | 6/1880 | Wesel | 101/383 |
|---|---|---|---|
| 558,587 | 4/1896 | Keller | 101/383 |
| 772,453 | 10/1904 | Berry | 101/383 |
| 844,123 | 2/1907 | Grainger et al. | 101/383 |
| 1,127,045 | 2/1915 | Lockwood | 101/383 |
| 1,486,422 | 3/1924 | Enstrom et al. | 101/394 |
| 1,781,979 | 11/1930 | Dickley et al. | 101/391 |
| 1,856,928 | 5/1932 | Pannier, Jr. | 101/28 |
| 1,866,379 | 7/1923 | Vandercook et al. | 101/383 |
| 1,938,359 | 2/1931 | Smith | 101/394 |
| 3,017,657 | 1/1962 | Mills | 16/114 R |
| 3,085,508 | 4/1963 | Hurwitz | 101/28 |
| 3,141,406 | 7/1964 | Weinland | 101/391 |
| 4,537,124 | 8/1985 | Graboyes | 101/28 |
| 4,850,950 | 7/1989 | Holliday | 493/475 |
| 4,867,668 | 9/1989 | Miyairi | 101/394 |

FOREIGN PATENT DOCUMENTS

| 0007602 | 11/1915 | United Kingdom | 101/28 |
|---|---|---|---|
| 0731848 | 6/1955 | United Kingdom | 101/394 |

Primary Examiner—Edgar S. Burr
Assistant Examiner—Anthony Nguyen
Attorney, Agent, or Firm—Watson, Cole, Grindle & Watson

[57] ABSTRACT

An embossing registration system is provided wherein an embossing block has at least one adjusting means in each corner of the block. A minimum of three adjusting means can be used to adjust the block left to right, backward and forward and to skew the block in any position needed to line up with printed material. Each corner adjuster includes a spring biased adjustment stud having a tapered annular groove such that the stud has an hour-glass shape. A set screw for each adjuster has a cone point which mates with the tapered groove. Turning the set screw forces the cone point into or out of the tapered groove which forces the adjustment stud in a perpendicular direction with respect to the axis of the set screw. Each adjustment stud may be spring biased so that each stud maintains a constant pressure on the side walls of the block cavity while positioning of the block takes place.

20 Claims, 2 Drawing Sheets

EMBOSSING REGISTRATION SYSTEM

FIELD OF THE INVENTION

The present invention relates to an embossing block and an adjustment system for the embossing block which can quickly bring the block into alignment with a design on a substrate to be embossed.

BACKGROUND OF THE INVENTION

Many embosser registering means encounter difficulty in quickly and precisely registering the print on a substrate to an embossing die. According to some methods, an embosser is cemented to a steel rule die after many trial and error attempts to register the embosser with print. Cam systems have also been used to shift an inserted embosser in order to obtain print registration. Such cams are difficult to operate and add considerably to the expense of the die and the time of setup.

U.S. Pat. No. 4,537,124 discloses an embosser mounting insert registering means wherein set screws contact an embosser insert such that longitudinal movement of the screws laterally move the insert to adjust registration of the embosser. Once the set screw is rotated so that proper registration is achieved, locking screws are used to lock the set screws in their positions. After repeated use, however, the set screws may need readjusting, which becomes difficult once the locking screws are in place. A great deal of time is necessary to remove the locking screws, readjust the set screws, and replace the locking screws. Also, problems arise with this device since the force of the set screws pushes directly against the steel rule die when they are tightened.

Accordingly, a need exists for an embossing registration system which provides a very precise adjustment of an embossing block in a fast and easy procedure.

SUMMARY OF THE INVENTION

It is an object of the present invention to provide a novel and useful embossing registration system for use in combination with a steel rule.

The present invention provides an embossing registration system wherein an embossing block has corner surfaces and at least one adjusting means in each corner. The block fits into a holding cavity which is formed in a die rule retaining board. The cavity has a corresponding configuration including corresponding corner surfaces. Two or more adjusting means can be used to adjust a triangular block left to right, backward and forward and to skew the block in any position needed to line up with printed material. Three or more adjusting means are used for a square or rectangular block. Each adjusting means is arranged in a corner of the block and comprises a spring biased adjustment stud having a tapered annular groove such that the stud has an hourglass shape. A set screw for each adjustment stud has a cone point which mates with the tapered groove. Turning the set screw forces the cone point into or out of the tapered groove which forces the adjustment stud in a perpendicular direction with respect to the axis of the set screw. Each adjustment stud may be spring biased so that each stud maintains constant pressure on the corner surfaces of the holding cavity while positioning of the block within the cavity takes place.

Four or eight adjusting means can be used for a square or rectangular block whereas only three or six are used for a triangular block. One of the adjusting means can be substituted in any configuration with a spring biased loading stud which does not have to be adjustable.

BRIEF DESCRIPTION OF THE DRAWINGS

The invention may be more fully understood with reference to the accompanying drawings and the following description of the embodiments shown in those drawings. The invention is not limited to the exemplary embodiments but should be recognized as contemplating all modifications within the skill of an ordinary artisan.

DETAILED DESCRIPTION OF PREFERRED EMBODIMENTS

Figure 1:
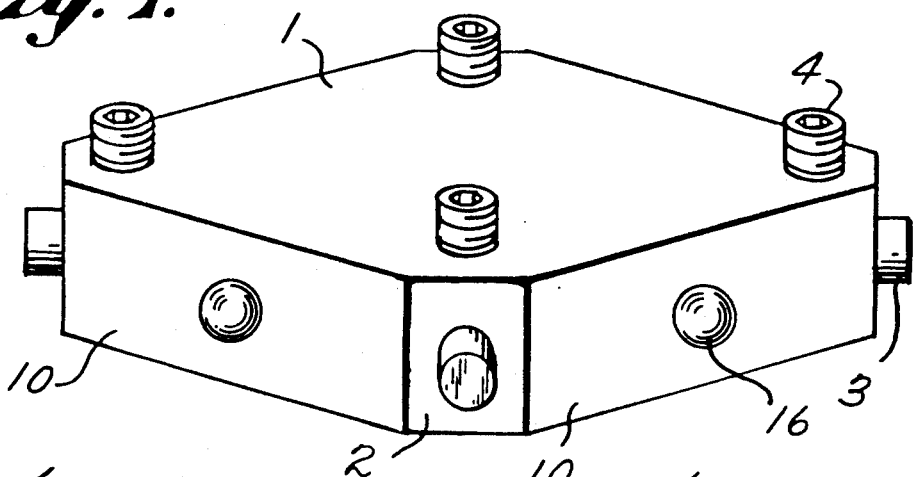
FIG. 1 is a perspective view of one embodiment according to the present invention.

FIG. 1 shows an embossing block in accordance with an embodiment of the present invention. The block 1 has a flat bottom surface and a top surface which receives a female embossing mold. The mold (not shown) is mounted to the embossing block by conventional means, for example, by a screw mounting. The female mold typically has holes which accommodate set screws 4 extending out of the top surface of the block 1. Each set screw 4 preferably has a hexagon shaped opening for receiving an allen wrench for the purpose of adjusting the screws.

Figure 2:
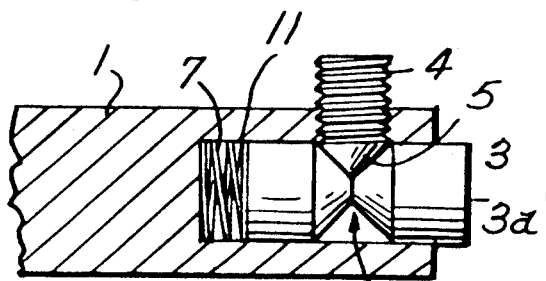
FIG. 2 is a cross-section of one corner adjuster according to an embodiment of the present invention.

As shown in FIG. 2, each set screw 4 has an engagement surface, preferably a cone point 5, which mates with a groove, preferably a tapered groove 6, of an adjustment stud 3. The tapered groove is considered circumferential or annular depending upon the shape of the adjustment stud. The stud 3 is spring biased with a spring 7 in a normally extended position. The stud may be generally cylindrical in shape or may have a substantially square cross-section. When the embossing block is set into a holding cavity of a die rule board, the adjustment studs 3, which normally extend from the embossing block due to the spring 7, maintain constant pressure on the side walls of the holding cavity which facilitates positioning in the cavity.

Any one of the adjustment studs can be replaced by a spring biased loading stud which is not adjustable. If used, the loading stud should have a stiffer spring biasing means than those of the adjustment studs. The loading stud is spring biased to maintain a constant force on the corner surface of a holding cavity in a die rule retaining board. Replacing an adjustment stud with a loading stud can achieve the same results as using an adjustment stud in each corner surface provided the number of adjustment studs is no more than one less than the number of corners to be adjusted. For example, in a triangular embossing block, two adjustment studs and one loading stud may be used. For a square or rectangular block, three adjustment studs and one leading stud may be used.

Alternative means for biasing the adjustment stud 3 or a loading stud in a normally extended position may include an elastomeric composition at the base of channel 12 in the adjustment block 1.

Each corner of the embossing block 1 is cut diagonally with respect to the side walls of the block such that corner surfaces 2 can accommodate an adjusting means such as the means shown in FIG. 2. The corner surfaces are generally at a 45 degree angle with respect to the adjacent side surfaces 10 of the block.

The holding cavity within the die rule board has a shape which substantially corresponds to the shape of the embossing block 1. With this arrangement, each corner adjuster 3 has a stud face 3A which contacts the flat surface of a corner of the holding cavity.

The adjustment stud may have any number of shapes for its stud face. The face 3A shown in FIG. 2 is flat and circular. Other shapes of the stud face include rounded or pointed configurations as well as inclined or radiused surfaces.

Figure 3:
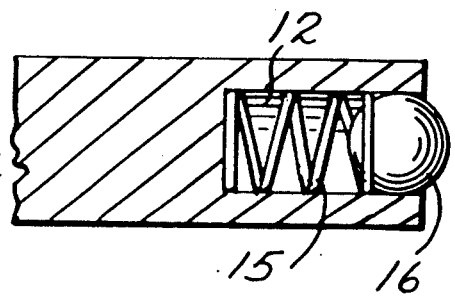
FIG. 3 is a cross-section of a spring loaded ball bearing used in an embossing block according to an embodiment of the present invention.

The embossing block may also comprise a number of spring loaded ball bearings 16 as shown in FIG. 3. Each ball bearing 16 is biased by a spring 15 which together are disposed within a channel 12 in an embossing block 1. The channel 12 has a tapered end so that the ball bearing cannot escape from the channel. The ball bearings, as shown in FIG. 1, are positioned in each side of the embossing block which help to maintain constant pressure on the side walls of the holding cavity while positioning of the embossing block takes place.

Figure 5:
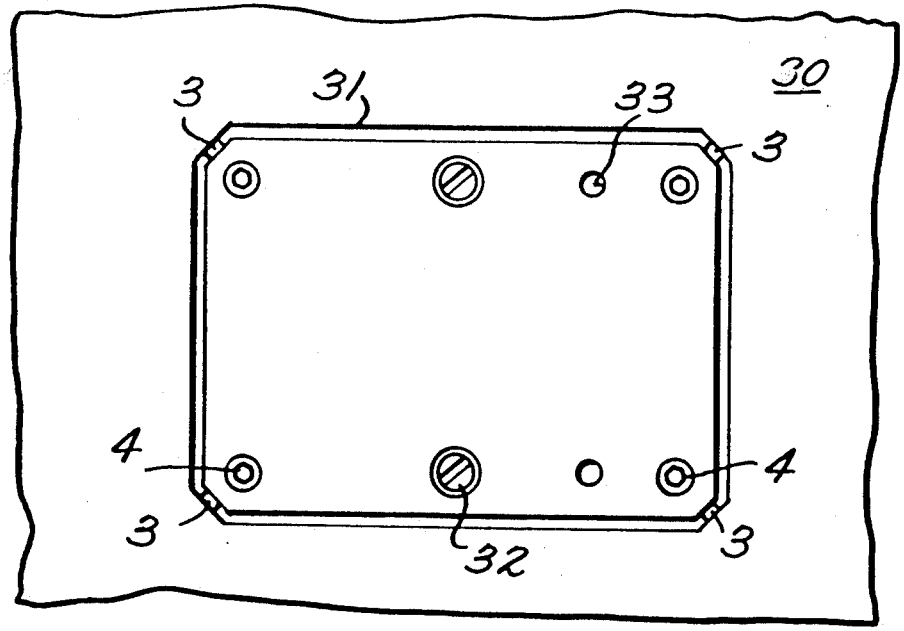
FIG. 5 is a top view of an embossing block according to the present invention recessed in a holding cavity of a die rule retaining board.

FIG. 5 shows an embossing block 1 according to the present invention which has been inserted into a holding cavity 31 of a die rule retaining board 30. The holding cavity has a configuration which receives the embossing block in a somewhat snug manner yet allows for a certain amount of movement in every direction of the block so as to enable precise registration of the block within the cavity. As can be seen, the corner surfaces of the holding cavity receive the flat end surfaces of the adjustment studs 3. Mounting screws 32 are used to mount a female embossing die to the embossing block. Alignment pins 33 enable precise registration of a male embossing mold (not shown).

The embossing block is preferably made of a hard metal such as steel but may comp aluminum or many other materials.

The configuration provides a fast and easy procedure to move an embossing block to any position required.

Figure 4:
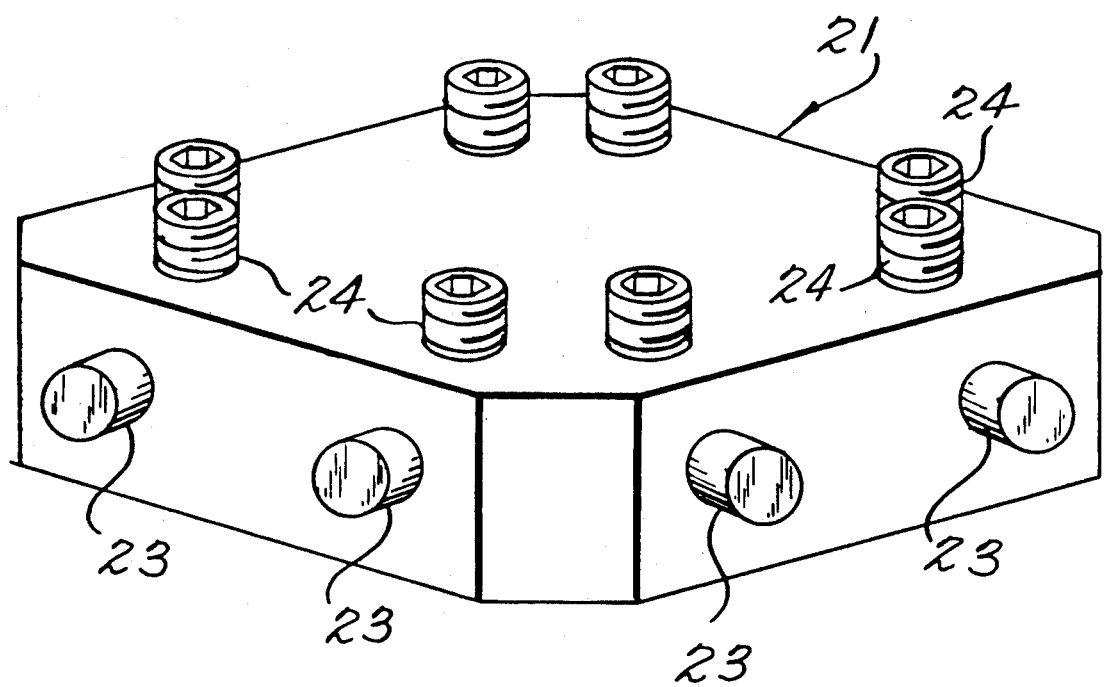
FIG. 4 is a perspective view of an alternative embodiment according to the present invention.

An alternative embodiment is that shown in FIG. 4 wherein 8 adjustment studs 23 are utilized. Eight set screws 24 are further utilized within the embossing block 21 so that an eight-way adjustment of the embossing block may be made.

Due to the hour-glass shape of the adjustment stud, a quick and easy adjustment of the embossing block alignment may be obtained. While springs are usually used to bias the adjustment studs, it has been found that the device will work without the use of biasing springs.

To properly align an embossing block according to the present invention, the set screws are loosened so that free movement of the embossing block within a holding cavity is obtained. Due to the spring biasing of each adjuster, according to a preferred embodiment, the embossing block may be held within a holding cavity without any of the set screws being completely tightened.

In order to move an embossing block, as shown in FIG. 1, in a backward direction, both back set screws are loosened and both front set screws are tightened. By adjusting certain combinations of the set screws, leftward, rightward, backward and forward adjustments can be made.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed:

1. An embossing block comprising a top surface, a bottom surface, side surfaces, corner surfaces, channels formed in said corner surfaces and recessed into said block, and adjustment means disposed in at least two of said channels and extending from said at least two channels past corresponding corner surfaces, each said adjustment means comprising an adjustment stud having a groove formed therein and a set screw having an engagement end, the engagement end mates with the groove of the adjustment stud and moves the stud into and out of the channel upon rotation of the set screw, said adjustment means providing a precise adjustment of block alignment when the block is inserted into a holding cavity of a die rule retaining board.

2. An embossing block as defined in claim 1, wherein a spring biased loading stud is provided in one of said channels and provides a constant force against a corner surface of a holding cavity when the block is inserted into the cavity.

3. An embossing block as defined in claim 1, wherein an adjustment stud is provided in each channel of the embossing block.

4. An embossing block as defined in claim 1, wherein each adjustment means is spring biased to extend from each channel and maintain a holding force against corner surfaces of a die rule retaining board.

5. An embossing block as defined in claim 2, wherein each adjustment means is spring biased to extend from each channel and maintain a holding force against corner surfaces of a die rule retaining board.

6. An embossing block as defined in claim 3, wherein each adjustment means is spring biased to extend from each channel and maintain a holding force against corner surfaces of a die rule retaining board.

7. An embossing block as defined in claim 1, wherein said adjustment stud is substantially cylindrical in shape and said groove is an annular groove.

8. An embossing block as defined in claim 2, wherein said loading stud is substantially cylindrical in shape.

9. An embossing block as defined in claim 1, wherein each side surface comprises a bearing channel therein, and a spring biased ball bearing is disposed within each bearing channel.

10. An embossing block as defined in claim 1, wherein said block comprises four corner surfaces and four adjustment means.

11. An embossing block as defined in claim 1, wherein said block comprises three corner surfaces and three adjustment means.

12. An embossing block as defined in claim 1, wherein each corner surface is at a 45° angle with respect to side surfaces adjacent the corner surface.

13. An embossing registration system comprising:

a die rule retaining board having a holding cavity formed therein, said holding cavity having side surfaces and corner surfaces; and an embossing block having a configuration corresponding to said holding cavity and comprising a top surface, a bottom surface, side surfaces, corner surfaces, channels formed in said corner surfaces and recessed into said block, and adjustment means disposed in at least two of said channels and extending from said at least two channels past corresponding corner surfaces, each said adjustment means comprising an adjustment stud having a groove formed therein and a set screw having an engagement end, the engagement end mates with the groove of the adjustment stud and moves the stud into and out of the channel upon rotation of the set screw, said adjustment means providing a precise adjustment of block alignment when the block is inserted into the holding cavity of the die rule retaining board.

14. An embossing registration system as defined in claim 13, wherein a spring biased loading stud is provided in one of said channels and provides a constant force against the corner surface of the holding cavity when the block is inserted into the cavity.

15. An embossing registration system as defined in claim 13, wherein an adjustment stud is provided in each channel of the embossing block.

16. An embossing registration system as defined in claim 13, wherein each adjustment means is spring biased to extend from each channel and maintain a holding force against the corner surfaces of the die rule retaining board.

17. An embossing registration system as defined in claim 14, wherein each adjustment means is spring biased to extend from each channel and maintain a holding force against the corner surfaces of the die rule retaining board.

18. An embossing registration system as defined in claim 15, wherein each adjustment means is spring biased to extend from each channel and maintain a holding force against the corner surfaces of the die rule retaining board.

19. An embossing registration system as defined in claim 13, wherein said adjustment stud is substantially cylindrical in shape and said groove is an annular groove.

20. An embossing registration system as defined in claim 13, wherein each corner surface of said block is at a 45° angle with respect to adjacent side surfaces of said block.

* * * * *